J. F. Blood.
Button.

No. 90,631.            Patented June 1, 1869.

Witnesses.
Jno. S. Slater.
Frank A. Jackson.

Joseph F. Blood
By his Atty.

United States Patent Office.

JOSEPH F. BLOOD, OF PROVIDENCE, RHODE ISLAND.

Letters Patent No. 90,631, dated June 1, 1869.

IMPROVEMENT IN BUTTON-FASTENINGS

The Schedule referred to in these Letters Patent and making part of the same.

*To all whom it may concern:*

Be it known that I, JOSEPH F. BLOOD, of the city and county of Providence, and State of Rhode Island, have invented a certain new and useful Stud or Button.

My invention consists in the novel construction of a shirt-stud or button, having an L-shaped shank and a spring lever, so combined and operating, as to render it, while being worn, but little liable to accidental displacement.

I do hereby declare the following specification, taken in connection with the drawings furnished, and forming a part of the same, to be a clear, true, and full description of my said invention.

A represents the face-plate.

B is an L-shaped shank, soldered to the back of the face-plate.

C is a spring-arm, embracing and hinged or riveted to the outer end of the L-shaped shank B.

Figure 3:
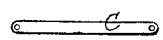

Figure 3 represents the spring-arm C in course of construction—a longitudinal piece of hard-rolled flat metal, with holes drilled at the end, so that when the piece shall be doubled, the holes will match the rivet or pin-hole in the shank B.

Figure 4:

Figure 4 represents the same after it has been doubled, the sides being parallel, and ready for attachment to the shank B.

Figure 5:

Figure 5 represents a stud complete, with its shank square to the front, and exhibits the form of the shank B, and the connection therewith of the arm C.

It will be observed that the shank B has cam-shaped projections on each side of the end nearest the centre of the stud.

These projections serve to spring out the sides of the lever or spring-arm C, as it is brought over and pressed upon the shank. As the sides of the arm spring outward, they pass the projections and fly back to their normal position, the sides springing inward.

It is obvious that these projections should be provided with an easy inclined plane above and below, in order to secure an easy movement of the spring-arm C in its operations.

Figure 1:
Figure 1 represents in perspective one of my studs complete.
Figure 2:
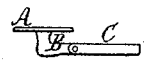
Figure 2 represents in section one of my studs with the parts ready for insertion into an eyelet.

The operation and application to use of one of my herein-described studs are as follows:

Eyelet-holes having been prepared in a garment with which it is intended to use my studs, I should insert the end of the arm C (it having been extended, as shown in figs. 2 and 5,) into the eyelet-hole, and pass it through to the shank, which in turn enters the hole, the button or stud being slightly turned, in an obvious manner. Being thus inserted, it is only necessary to turn down the arm C, causing it to spring over and by the projections on the shank B, and form in fact a cross-lever, securing it in the hole, the parts then being in position, as shown in fig. 1.

Having thus described my invention,

I claim as new, and desire to secure by Letters Patent of the United States—

1. The L-shaped shank B, with its cam-shaped projections, secured to the back of the stud or button, in the manner and for the purposes specified.

2. The improved shirt-stud or button herein described, consisting of the front A, shank B, having cam-shaped projections, and spring-arm C, constructed and operating substantially in the manner and for the purpose specified.

JOSEPH F. BLOOD.

Witnesses:
EDWIN BAKER,
DANIEL SAYLES.